US012803064B2

(12) United States Patent
Kubo et al.

(10) Patent No.: US 12,803,064 B2
(45) Date of Patent: Nov. 17, 2026

(54) LEAD SULFATE COATING REMOVAL DEVICE, LEAD SULFATE COATING REMOVAL SYSTEM, AND LEAD SULFATE COATING REMOVAL METHOD

(71) Applicant: POWER SUPPORT CO., LTD., Tokyo (JP)

(72) Inventors: Takashi Kubo, Tokyo (JP); Katsushi Igarashi, Tokyo (JP)

(73) Assignee: Power Support Company Limited, Tokyo (JP)

( * ) Notice: Subject to any disclaimer, the term of this patent is extended or adjusted under 35 U.S.C. 154(b) by 0 days.

(21) Appl. No.: 18/426,318

(22) PCT Filed: Jan. 15, 2024

(86) PCT No.: PCT/JP2024/000773
§ 371 (c)(1),
(2) Date: Jan. 29, 2024

(87) PCT Pub. No.: WO2024/157818
PCT Pub. Date: Aug. 2, 2024

(65) Prior Publication Data
US 2025/0343282 A1 Nov. 6, 2025

(30) Foreign Application Priority Data
Jan. 26, 2023 (JP) ................................ 2023-010376

(51) Int. Cl.
*H01M 10/42* (2006.01)
*H01M 10/48* (2006.01)

(52) U.S. Cl.
CPC ....... *H01M 10/4242* (2013.01); *H01M 10/48* (2013.01)

(58) Field of Classification Search
CPC ...... H01M 10/54; H01M 10/06; H01M 10/12; H01M 10/128; H01M 4/0447; H01M 4/16; H01M 4/22; H01M 4/23
See application file for complete search history.

(56) References Cited

U.S. PATENT DOCUMENTS

2013/0141053 A1* 6/2013 Kondo ............. H01M 10/4242 320/141

FOREIGN PATENT DOCUMENTS

JP 2006164540 A 6/2006
JP 2012-048886 A 3/2012
(Continued)

OTHER PUBLICATIONS

International Search Report issued on Mar. 19, 2024.

*Primary Examiner* — Christopher P Domone
(74) *Attorney, Agent, or Firm* — Apex Juris, pllc; Tracy M Heims

(57) ABSTRACT

[Problem] An object is to provide a lead sulfate coating removal device that has low power consumption and does not damage an electrode of a lead-acid battery.
[Solution] A lead sulfate coating removal device implemented by an application specific integrated circuit (ASIC) that removes a lead sulfate coating generated on an electrode of a lead-acid battery includes: a generation unit that generates, on the basis of a signal extracted from the lead-acid battery, a removal signal of the lead sulfate coating having a peak value of 550 mA to 1000 mA, a pulse width of 5 nsec to 100 nsec, and a frequency of 5 kHz to 50 kHz; and a supply unit that supplies the removal signal generated by the generation unit to the electrode of the lead-acid battery.

4 Claims, 3 Drawing Sheets

(56) References Cited

FOREIGN PATENT DOCUMENTS

| | | | |
|---|---|---|---|
| JP | 5096538 | B2 | 9/2012 |
| WO | 2016189630 | A1 | 12/2016 |

* cited by examiner (a)

| Voltage value of lead-acid battery (V) | Peak current value (mA) |
|---|---|
| 11.9 | 675 |
| 12.9 | 733 |
| 13.9 | 793 |

(b)

| Voltage value of lead-acid battery (V) | Peak current value (mA) |
|---|---|
| 11.9 | 540 |
| 12.9 | 570 |
| 13.9 | 600 |

| | Measurement Details | Before Recovery | After Recovery |
|---|---|---|---|
| Golf Cart a | Voltage value (V) | 13.05 | 13.03 |
| | Internal resistance value (m Ω) | 8.76 | 8.29 |
| Golf Cart b | Voltage value (V) | 13.01 | 13.00 |
| | Internal resistance value (Ω) | 8.86 | 8.41 |
| Automobile c | Voltage value (V) | 12.64 | 13.07 |
| | CCA value | 711 | 826 |
| | Internal resistance value (m Ω) | 3.25 | 2.80 |
| Automobile d | Voltage value (V) | 13.29 | 13.42 |
| | Weighted Average | 1.00 | 1.20 |
| | Internal resistance value (m Ω) | 6.94 | 6.03 |

FIG. 5

LEAD SULFATE COATING REMOVAL DEVICE, LEAD SULFATE COATING REMOVAL SYSTEM, AND LEAD SULFATE COATING REMOVAL METHOD

BACKGROUND OF THE INVENTION

1. Technical Field

The present invention relates to a lead sulfate coating removal device, a lead sulfate coating removal system, and a lead sulfate coating removal method, and particularly relates to a lead sulfate coating removal device, a lead sulfate coating removal system, and a lead sulfate coating removal method for removing a lead sulfate coating generated at a negative electrode of a lead-acid battery.

2. Description of the Related Art

Patent Literature 1 discloses a lead sulfate coating removal device for shortening a period of time required for removal of lead sulfate coatings generated in a positive electrode and a negative electrode of a lead-acid battery, while reducing heat regeneration during the removal of the lead sulfate coatings. In this lead sulfate coating removal device, a switching circuit is driven by using a pulse wave drive signal having a pulse width of 1.6 μsec (16000 nsec) and a frequency of 20000 Hz, the switching circuit is switched on to allow extraction of a current of 500 mA from a battery (lead-acid battery) via a resistor R1, while being switched off to stop the extraction of the current, when the switching circuit is switched off, a back electromotive force and a reverse current of 500 mA are supplied to the lead-acid battery, the supplied reverse current is negative current in the form of spikes, and this current acts on the electrodes of the lead-acid battery and thereby removes the lead sulfate coatings depositing on the electrodes of the lead-acid battery.

CITATION LIST

Patent Literature

Patent Literature 1: JP 2012-48886 A

However, the lead sulfate coating removal device disclosed in Patent Literature 1 has relatively high power consumption, and in order to achieve an energy goal listed in Sustainable Development Goals (SDGs), it is necessary to reduce the power consumption.

Furthermore, in the lead sulfate coating removal device disclosed in Patent Literature 1, an amount or level of the reverse current supplied to the electrodes of the lead-acid battery is relatively excessive or high, and the electrodes of the lead-acid battery are damaged. If a life of the lead-acid battery is shortened by using the lead sulfate coating removal device disclosed in Patent Literature 1, it would be putting the cart before the horse.

Moreover, in order to improve a removal efficiency of the lead sulfate coatings generated on the electrodes of the lead-acid battery, it is desirable to increase a peak value of a current of a removal signal of the lead sulfate coatings, which is generated on the basis of a signal extracted from the lead-acid battery. However, when the peak value is increased, the power consumption of the lead sulfate coating removal device also increases. In addition, according to findings by the inventors, in a case where the lead sulfate coating removal device is configured by an analog circuit, an upper limit of the peak value based on the power consumption of the lead sulfate coating removal device is 1000 mA at most.

Thus, an object of the present invention is to increase a peak value of a removal signal of a lead sulfate coating by setting power consumption of a lead sulfate coating removal device within an allowable range without adopting an approach of configuring the lead sulfate coating removal device with an analog circuit.

SUMMARY OF THE INVENTION

In order to achieve the above object, the present inventors have conducted earnest studies on a removal signal for removing a lead sulfate coating generated on an electrode of a lead-acid battery, and resultantly found that as a peak value thereof is relatively large, as a pulse width thereof is relatively wide, and as a frequency thereof is relatively high, they contribute to the removal of the lead sulfate coating, and in addition, when a lead sulfate coating removal device is implemented by an application specific digital integrated circuit, the peak value of the removal signal of the lead sulfate coating can be increased.

Specifically, a lead sulfate coating removal device implemented by an application specific digital integrated circuit that removes a lead sulfate coating generated on an electrode of a lead-acid battery includes:

a generation unit that generates, on the basis of a signal extracted from the lead-acid battery, a removal signal of the lead sulfate coating having a peak value of 550 mA to 1000 mA, a pulse width of 5 nsec to 100 nsec, and a frequency of 5 kHz to 50 kHz; and a supply unit that supplies the removal signal generated by the generation unit to the electrode of the lead-acid battery.

Note that the digital integrated circuit can include:

a reference power supply circuit that generates a proportional to absolute temperature ($P_{TAT}$) signal;

a constant current circuit that generates a complementary to absolute temperature ($C_{TAT}$) signal on the basis of the $P_{TAT}$ signal generated by the reference power supply circuit;

a control circuit that controls on/off switching of an output of a merged signal of the $P_{TAT}$ signal generated by the reference power supply circuit and the $C_{TAT}$ signal generated by the constant current circuit;

an inter-terminal switch circuit that switches electrical connection between a first electrode terminal and a second electrode terminal of the lead-acid battery on the basis of the merged signal subjected to the control of the on/off switching of the output by the control circuit;

an oscillation circuit that generates a pulse signal based on the $P_{TAT}$ signal generated by the reference power supply circuit and the $C_{TAT}$ signal generated by the constant current circuit;

a frequency dividing circuit that divides a frequency of the pulse signal generated by the oscillation circuit;

a level shift circuit that shifts a level of a power supply voltage on the basis of the pulse signal whose frequency is divided by the frequency dividing circuit;

a drive circuit that generates a drive signal of a pulse driver circuit on the basis of the voltage whose level is shifted by the level shift circuit;

a drive switch circuit that switches presence or absence of an output of the drive signal on the basis of the pulse signal divided by the frequency dividing circuit; and the pulse driver circuit that generates the removal signal on the basis of the drive signal whose presence or absence of the output is switched by the drive switch circuit.

Furthermore, in the present invention, a lead sulfate coating removal method using a lead sulfate coating removal device implemented by an application specific digital integrated circuit that removes a lead sulfate coating generated on an electrode of a lead-acid battery includes:

generating, on the basis of a signal extracted from the lead-acid battery, a removal signal of the lead sulfate coating having a peak value of 550 mA to 1000 mA, a pulse width of 5 nsec to 100 nsec, and a frequency of 5 kHz to 50 kHz; and supplying the generated removal signal to the electrode of the lead-acid battery.

Here, it has been confirmed that good results are obtained in a case where, for example, conditions of the pulse width and the frequency are set to the above ranges and the peak value is set to 550 mA to 1000 mA. Specifically, an amount of the lead sulfate coating removed has exceeded an amount of the lead sulfate coating generated on a lead-acid battery negative electrode terminal, and the lead sulfate coating has been able to be effectively removed, while no damage has been found in the electrode of the lead-acid battery.

Similarly, it has been confirmed that good results are obtained also in a case where conditions of the frequency and the peak value are set to the above ranges and the pulse width is set to 5 nsec to 100 nsec. Also in this case, an amount of the lead sulfate coating removed has exceeded an amount of the lead sulfate coating generated on the lead-acid battery negative electrode terminal, and the lead sulfate coating has been able to be effectively removed, while no damage has been found in the electrode of the lead-acid battery.

Moreover, it has been confirmed that good results are obtained also in a case where conditions of the pulse width and the peak value are set to the above ranges and the frequency is set to 5 kHz to 50 kHz. Also in this case, an amount of the lead sulfate coating removed has exceeded an amount of the lead sulfate coating generated on the lead-acid battery negative electrode terminal, and the lead sulfate coating has been able to be effectively removed, while no damage has been found in the electrode of the lead-acid battery.

Therefore, the present invention can provide the lead sulfate coating removal device that has low power consumption and does not damage the electrode of the lead-acid battery by optimizing the peak value, the pulse width, and the frequency of the removal signal.

Furthermore, the lead sulfate coating removal device of the present invention also has a secondary effect of downsizing the device. A size of a product sold by a patentee of Patent Literature 1 is about 11 cm×about 5.5 cm×about 2 cm on a housing basis, but this size can be downsized to about 3.5 cm×about 6.0 cm×about 1.5 cm.

Moreover, by achieving low power consumption, the lead sulfate coating removal device of the present invention can implement the lead sulfate coating removal device that greatly exceeds an effect of reducing a temperature increase, which is an object of Patent Literature 1.

Moreover, a lead sulfate coating removal system of the present invention includes:

the lead sulfate coating removal device;

a measurement device that performs measurement indicating performance of a lead-acid battery to which the lead sulfate coating removal device is connected; and a transmission device that transmits a measurement result measured by the measurement device.

According to the lead sulfate coating removal system of the present invention, in addition to removing a lead sulfate coating generated in a lead-acid battery of a communication base station used in a mountain area or the like, it is possible to transmit a measurement result that serves as a basis for determining replacement standards for the lead-acid battery to an administrator in a remote location, for example.

BRIEF DESCRIPTION OF THE DRAWINGS

FIGS. 4A and 4B are diagrams illustrating measurement results of a "peak current value" measured in a state where the lead sulfate coating removal device is connected to a lead-acid battery as illustrated in FIG. 1, and measurement results of a voltage value and a current value corresponding to a "peak current value" measured in a state where a lead sulfate coating removal device of a comparative example implemented by an analog circuit is connected to the lead-acid battery in order to compare with the measurement results; and FIG. 5 is a diagram illustrating measurement results of lead-acid battery voltage values and the like before and after recovery of the lead sulfate coating removal device for the lead-acid battery mounted on a vehicle and the like.

REFERENCE SIGNS LIST

Figure 1:
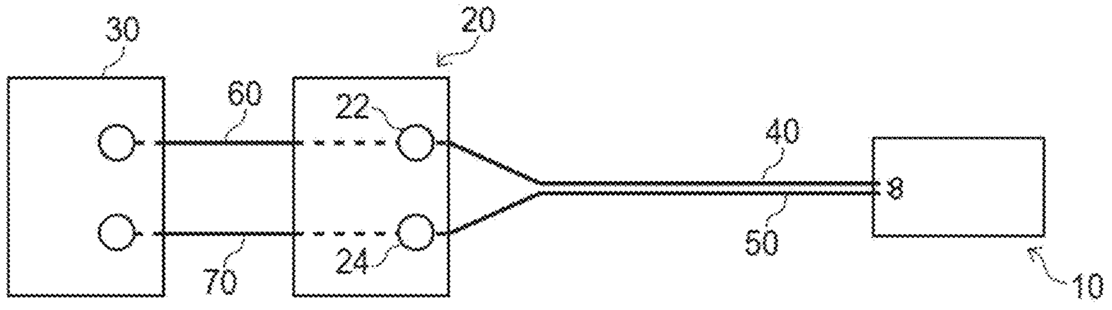
FIG. 1 is an explanatory diagram illustrating a conceptual use example of a lead sulfate coating removal device of an embodiment of the present invention.

10 Lead sulfate coating removal device
11 Reference power supply circuit
12 Constant current circuit
13A Control circuit
13B Inter-terminal switch circuit
14 Oscillation circuit
15 First frequency dividing circuit
16 Second frequency dividing circuit
17 Level shift circuit
18A Drive circuit
18B Pulse driver circuit
19 Drive switch circuit
100A Substrate positive electrode terminal
100B Substrate negative electrode terminal
110 Power supply unit
120 Drive resistor
130, 140 Voltage dividing resistor
150 Switching circuit
160 Signal generation unit
170 Pulse driver circuit

DETAILED DESCRIPTION

Hereinafter, a lead sulfate coating removal device, a method, and a system of an embodiment of the present invention will be described with reference to the drawings.

FIG. 1 is an explanatory diagram illustrating a conceptual use example of a lead sulfate coating removal device 10 of the embodiment of the present invention. FIG. 1 illustrates a state where the lead sulfate coating removal device 10 and a lead-acid battery 20 are connected by a connection line 40 and a connection line 50, and the lead-acid battery 20 and a power supply 30 are connected by a connection line 60 and a connection line 70.

Note that what a user needs to prepare when the lead sulfate coating removal device 10 is actually used is nothing other than the lead sulfate coating removal device 10, the connection line 40, and the connection line 50, and the other objects do not need to be prepared. In other words, as for the lead-acid battery 20 and the power supply 30, it is intended to use those mounted on an automobile or the like.

The lead sulfate coating removal device 10 is implemented by an application specific digital integrated circuit (application specific integrated circuit, hereinafter, referred to as "ASIC"). A specific circuit configuration thereof will be described later with reference to FIGS. 2 and 3.

The lead-acid battery 20 is mounted on an automobile such as a passenger car, an electric vehicle such as a golf cart, a work vehicle such as a forklift, and a radio such as a disaster prevention radio system. For example, in the case of the automobile, the lead-acid battery 20 plays a role of supplying electric power to an electric component such as a light, performing backup to various computer devices, and the like in addition to starting an engine of the automobile. The lead-acid battery 20 itself is irrelevant to a configuration and the like of the lead sulfate coating removal device 10 of the embodiment of the present invention, and thus will not be described in detail here.

The power supply 30 is a power supply source for the lead-acid battery 20, and corresponds to an alternator in the case of an automobile, for example. The power supply 30 itself is irrelevant to the configuration and the like of the lead sulfate coating removal device 10 of the embodiment of the present invention, and thus will not be described in detail here.

The connection line 40 connects a substrate positive electrode terminal 100A (FIG. 2) of the lead sulfate coating removal device 10 and a lead-acid battery positive electrode terminal 22 of the lead-acid battery 20. The connection line 50 connects a substrate negative electrode terminal 1001B (FIG. 2) of the lead sulfate coating removal device 10 and a lead-acid battery negative electrode terminal 24 of the lead-acid battery 20. The connection lines 40 and 50 can be used without any particular limitation as long as they can electrically connect the lead sulfate coating removal device 10 and the lead-acid battery 20.

The connection line 60 connects the lead-acid battery positive electrode terminal 22 of the lead-acid battery 20 and a positive electrode terminal (not illustrated) of the power supply 30. The connection line 70 connects the lead-acid battery negative electrode terminal 24 of the lead-acid battery 20 and a negative electrode terminal (not illustrated) of the power supply 30. The connection lines 60 and 70 can be used without any particular limitation as long as they can electrically connect the lead-acid battery 20 and the power supply 30.

Figure 2:
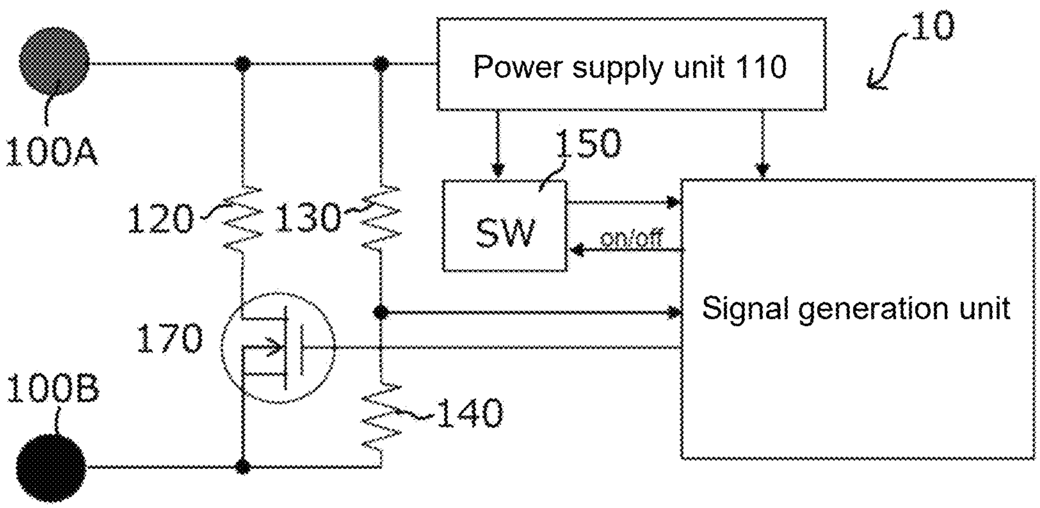
FIG. 2 is a block diagram partially and functionally illustrating a circuit configuration of the lead sulfate coating removal device illustrated in FIG. 1.

FIG. 2 is a block diagram partially and functionally illustrating the circuit configuration of the lead sulfate coating removal device 10 illustrated in FIG. 1. The lead sulfate coating removal device 10 is implemented by the ASIC as described above, and when the ASIC is partially and functionally indicated, the ASIC can be organized to include the substrate positive electrode terminal 100A and the substrate negative electrode terminal 100B, a power supply unit 110, a drive resistor 120, voltage dividing resistors 130 and 140, a switching circuit 150, a signal generation unit 160, and a pulse driver circuit 170, which will be described below.

The substrate positive electrode terminal 100A and the substrate negative electrode terminal 1001B are electrically connected to the lead-acid battery positive electrode terminal 22 and the lead-acid battery negative electrode terminal 24 of the lead-acid battery 20 through the connection line 40 and the connection line 50, respectively. The substrate positive electrode terminal 100A is connected in parallel to the drive resistor 120, the voltage dividing resistors 130 and 140, and the power supply unit 110.

A part of a current (signals extracted from the lead-acid battery 20) flowing through the substrate positive electrode terminal 100A flows through the drive resistor 120 toward the pulse driver circuit 170 located downstream thereof. Furthermore, a part of the current flows through the voltage dividing resistor 130 of the voltage dividing resistors 130 and 140 toward the signal generation unit 160. The rest of the current flows toward the power supply unit 110.

The power supply unit 110 includes, for example, a preceding-stage power supply circuit having a relatively high pressure and a subsequent-stage power supply circuit having a relatively low pressure, which are connected in series. Therefore, an output voltage $V_H$ having a relatively high pressure of the preceding-stage power supply circuit, which is generated using the lead-acid battery 20 as a power supply, is indirectly applied to the signal generation unit 160 via the switching circuit 150, and an output voltage $V_L$ having a relatively low pressure of the subsequent-stage power supply circuit is directly applied to the signal generation unit 160. As a matter of course, physically, one power supply circuit may be divided to obtain the output voltage $V_H$ and the output voltage $V_L$.

The drive resistor 120 defines a current value flowing through the pulse driver circuit 170. A resistance value of the drive resistor 120 may be determined according to a voltage value of the lead-acid battery 20, resistance values of the voltage dividing resistors 130 and 140, an input resistance value of the power supply unit 110, and the like. Note that, in a case where these are set as conditions to be described later, the resistance value of the drive resistor 120 may be set to about 10Ω to 30Ω (for example, about 15Ω).

The voltage dividing resistors 130 and 140 define a value of a current flowing toward the signal generation unit 160. Each resistance value of the voltage dividing resistors 130 and 140 may be determined according to a voltage of the lead-acid battery 20, a resistance value of the drive resistor 120, an input resistance value of the power supply unit 110, and the like, but the resistance value of the voltage dividing resistor 130 can be set to about 0Ω to 20Ω (for example, about 0Ω), and the resistance value of the voltage dividing resistor 140 can be set to about 100Ω to 300Ω (about 200Ω).

The switching circuit 150 is implemented by a transistor such as a field effect transistor (FET) in this example, and executes a switching operation according to an on/off signal to be described later output from the signal generation unit 160. When the switching circuit 150 is in an on state, the output voltage $V_H$ of the preceding-stage power supply circuit of the power supply unit 110 is applied to the signal generation unit 160, and when the switching circuit 150 is in an off state, the application of the output voltage $V_H$ to the signal generation unit 160 is stopped.

The signal generation unit 160 generates the above-described on/off signal to be supplied to the switching circuit 150 on the basis of the output voltages $V_H$ and $V_L$. This on/off signal is supplied to the switching circuit 150. Furthermore, the signal generation unit 160 includes a constant current source output circuit, an oscillator, and a frequency dividing circuit, and generates a control signal for generating a removal signal on the basis of the voltages $V_H$ and $V_L$. This control signal has a sawtooth waveform and becomes a gate current output to a gate of the pulse driver circuit 170.

Here, the signal generation unit 160 operates a removal signal to be finally supplied to the electrode of the lead-acid battery 20 under, for example, the following conditions so as to be a pulse signal having a sawtooth waveform and having a peak value of 550 mA to 1000 mA, a pulse width of 5 nsec to 100 nsec, and a frequency of 5 kHz to 50 kHz.

That is, the output voltage $V_H$ of the preceding-stage power supply circuit of the power supply unit 110 is set to about 9.0 V to 11.0 V (for example, 10.0 V), the output voltage $V_L$ of the subsequent-stage power supply circuit is set to about 5.0 V to 6.0 V (for example, 5.5 V), an oscillation frequency of the oscillator of the signal generation unit 160 is set to about 1.0 MHz to about 5.0 MHz (for example, about 2.5 MHz), the frequency dividing circuit is configured by, for example, a divide-by-2 circuit and a synchronous divide-by-62 circuit, and a frequency is set to about 0.6 MHz to about 2.5 MHz (for example, about 1.25 MHz) by the former, and a frequency is set to about 9.67 kHz to about 40.32 kHz (for example, about 20.16 kHz) by the latter. As a result, a voltage of the lead-acid battery 20 can generate a pulse signal having a pulse width of about 5 nsec to about 100 nsec depending on the frequency after frequency division.

When the pulse signal is supplied to the constant current source output circuit configured by a p-channel metal-oxide semiconductor (PMOS) transistor and a switch configured by an n-Channel Metal-Oxide Semiconductor (NMOS) to which the voltages $V_H$ and $V_L$ are supplied, a control signal having a sawtooth waveform and having a peak value of about 550 mA to about 1000 mA, a pulse width of about 5 nsec to about 100 nsec, and a frequency of about 5 kHz to about 50 kHz can be generated.

The pulse driver circuit 170 generates a removal signal according to a control signal output from the signal generation unit 160. The pulse driver circuit 170 can be implemented by, for example, a transistor such as an FET. In the case of this configuration, theoretically, the removal signal has the same pulse width and the same frequency as those of the control signal. This removal signal is supplied to the lead-acid battery 20 through the substrate positive electrode terminal 100A and the substrate negative electrode terminal 100B, and can remove a lead sulfate coating of the lead-acid battery negative electrode terminal 24.

Figures 3, 4:
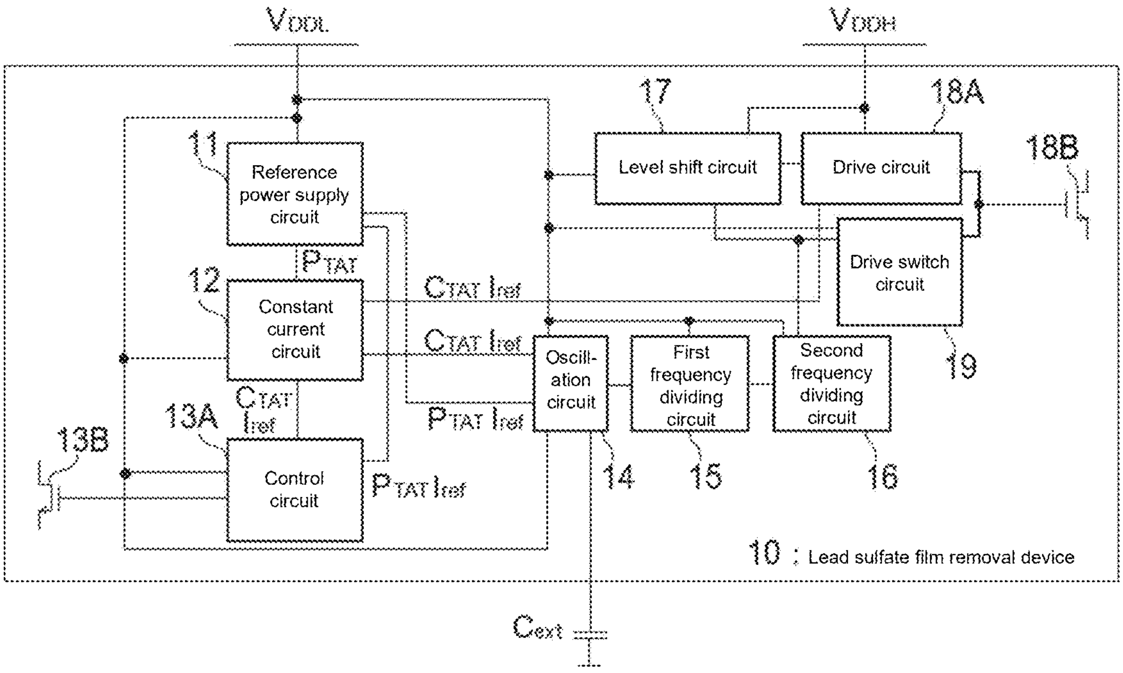
FIG. 3 is a diagram illustrating circuit topology of the lead sulfate coating removal device illustrated in FIG. 2.

FIG. 3 is a diagram illustrating circuit topology of the lead sulfate coating removal device 10 illustrated in FIG. 2. The lead sulfate coating removal device 10 is implemented by the ASIC as described above, and the ASIC includes a reference power supply circuit 11, a constant current circuit 12, a control circuit 13A, an inter-terminal switch circuit 13B, an oscillation circuit 14, a first frequency dividing circuit 15, a second frequency dividing circuit 16, a level shift circuit 17, a drive circuit 18A, a pulse driver circuit 18B, and a drive switch circuit 19, which will be described below.

Here, relationships between the portions illustrated in FIG. 2 and the portions illustrated in FIG. 3 do not indicate all corresponding portions in the respective drawings, and the portions do not necessarily correspond one by one, and thus, the relationships are organized conceptually and are roughly as follows. That is, although not directly illustrated in FIG. 3, the power supply unit 110 illustrated in FIG. 2 corresponds to a portion generating a high power supply voltage $V_{DDH}$ (corresponding to the "output voltage $V_H$" described with reference to FIG. 2) and a low power supply voltage $V_{DDL}$ (corresponding to the "output voltage $V_L$" described with reference to FIG. 2), the drive resistor 120 illustrated in FIG. 2 corresponds to a portion (not illustrated) connected to the pulse driver circuit 18B illustrated in FIG. 3, the voltage dividing resistors 130 and 140 illustrated in FIG. 2 correspond to the drive circuit 18A illustrated in FIG. 3, the switching circuit 150 illustrated in FIG. 2 corresponds to the drive switch circuit 19 illustrated in FIG. 3, the signal generation unit 160 illustrated in FIG. 2 corresponds to the reference power supply circuit 11, the constant current circuit 12, the control circuit 13A, the inter-terminal switch circuit 13B, the oscillation circuit 14, the first frequency dividing circuit 15, and the second frequency dividing circuit 16 illustrated in FIG. 3, and the pulse driver circuit 170 illustrated in FIG. 2 corresponds to the pulse driver circuit 18B illustrated in FIG. 3.

The reference power supply circuit 11 can be configured by a so-called bandgap reference (BGR) circuit, is supplied with the low power supply voltage $V_{DDL}$, generates a proportional to absolute temperature ($P_{TAT}$) signal serving as a reference signal (reference current), and outputs the $P_{TAT}$ signal to the constant current circuit 12, the control circuit 13A, and the oscillation circuit 14 (note that what is used as the reference signal is denoted by "$I_{ref}$" in FIG. 3, and the same applies hereinafter).

The constant current circuit 12 is supplied with the low power supply voltage $V_{DDL}$, receives an input of the $P_{TAT}$ signal output from the reference power supply circuit 11, generates a complementary to absolute temperature ($C_{TAT}$) signal on the basis of the $P_{TAT}$ signal, and outputs the $C_{TAT}$ signal to the control circuit 13A, the oscillation circuit 14, and the drive circuit 18A.

The control circuit 13A is supplied with the low power supply voltage $V_{DDL}$, receives an input of the $P_{TAT}$ signal output from the reference power supply circuit 11 and the $C_{TAT}$ signal output from the constant current circuit 12, generates a merged signal of the $P_{TAT}$ signal and the $C_{TAT}$ signal, and controls on/off switching of an output of the merged signal. Specifically, a threshold SL and a threshold SH to be compared with the low power supply voltage $V_{DDL}$ are set in the control circuit 13A, and control is performed such that the merged signal is output to the inter-terminal switch circuit 13B when the threshold $S_L \leq$ the low power supply voltage $V_{DDL} \leq$ the threshold $S_H$ holds, and the merged signal is not output to the inter-terminal switch circuit 13B in other cases.

The inter-terminal switch circuit 13B can be configured by, for example, an NMOS transistor, and includes a gate that receives an input of the merged signal from the control circuit 13A, a source connected to the lead-acid battery negative electrode terminal 24 of the lead-acid battery 20, and a drain connected to the lead-acid battery positive electrode terminal 22 of the lead-acid battery 20 via an element such as a resistor or a diode for voltage and current adjustment, and switches electrical connection between the lead-acid battery positive electrode terminal 22 and the lead-acid battery negative electrode terminal 24 according to presence or absence of an output of the merged signal.

The oscillation circuit 14 is supplied with the low power supply voltage $V_{DDL}$, receives inputs of the $P_{TAT}$ signal output from the reference power supply circuit 11 and the $C_{TAT}$ signal output from the constant current circuit 12, generates a pulse signal on the basis of these signals, and outputs the pulse signal to the first frequency dividing circuit 15. The oscillation circuit 14 generates a pulse signal having an oscillation frequency of, for example, 2.5 MHz.

The first frequency dividing circuit 15 is supplied with the low power supply voltage $V_{DDL}$, receives an input of the pulse signal having the oscillation frequency of, for example, 2.5 MHz output from the oscillation circuit 14, divides the oscillation frequency of the pulse signal into ½, that is, 1.25 MHz, for example, and outputs the pulse signal to the second frequency dividing circuit 16.

The second frequency dividing circuit 16 is a synchronous frequency dividing circuit that receives an input of the pulse signal having the oscillation frequency of, for example, 1.25 MHz output from the first frequency dividing circuit 15, divides the oscillation frequency of the pulse signal into, for example, 1/62, that is, 20.16 kHz, and outputs the pulse signal to the level shift circuit 17 and the drive switch circuit 19.

Note that frequency division conditions of the first frequency dividing circuit 15 and the second frequency dividing circuit 16 may be such that a pulse width of the pulse signal output from the second frequency dividing circuit 16 is 800 nsec in this example, and thus are not limited to "½" frequency division or "1/62" frequency division, and the number of frequency dividing circuits is also not limited to "2".

The level shift circuit 17 is supplied with the low power supply voltage $V_{DDL}$ and the high power supply voltage $V_{DDH}$, receives an input of the pulse signal having the pulse width of, for example, 800 nsec output from the second frequency dividing circuit 16, shifts levels of the low power supply voltage $V_{DDL}$ and the high power supply voltage $V_{DDH}$ on the basis of the pulse signal, and outputs a voltage signal after the level shift to the drive circuit 18A.

The drive circuit 18A can be configured by, for example, a PMOS transistor, is supplied with the high power supply voltage $V_{DDH}$, receives inputs of the voltage signal output from the level shift circuit 17, the $C_{TAT}$ signal output from the constant current circuit 12, and a switch signal output from the drive switch circuit 19, generates a drive signal on the basis of the voltage signal and the $C_{TAT}$ signal, and outputs the drive signal to the pulse driver circuit 18B according to the switch signal.

The drive switch circuit 19 can be configured by, for example, an NMOS transistor, is supplied with the low power supply voltage $V_{DDL}$, and includes a gate that receives an input of the pulse signal having the pulse width of, for example, 800 nsec output from the second frequency dividing circuit 16, a source that outputs the switch signal described above to the drive circuit 18A on the basis of the pulse signal, and a drain.

The pulse driver circuit 18B can be configured by, for example, an NMOS transistor, and includes a gate that receives an input of the drive signal output from the drive circuit 18A, a drain connected to the substrate positive electrode terminal 100A via the drive resistor 120, and a source connected to the substrate negative electrode terminal 100B.

FIG. 4A is a diagram illustrating measurement results of a "peak current value" measured in a state where the lead sulfate coating removal device 10 is connected to the lead-acid battery 20 as illustrated in FIG. 1. The "peak current value" mentioned here refers to a current value flowing from the lead-acid battery positive electrode terminal 22 to the lead-acid battery negative electrode terminal 24 via the lead sulfate coating removal device 10.

What were prepared for obtaining each measurement result illustrated in FIG. 4A are as follows.

The lead sulfate coating removal device 10 adopted the values exemplified in parentheses in the description made with reference to FIG. 2 for specifications of the respective elements. That is, taking the drive resistor 120 as an example, the value of about 15Ω was adopted.

The lead-acid battery 20 was a lead-acid battery 20 that is so-called "12 V lead-acid battery" with a model number "100D23R/C6 sealed type" of the caos series manufactured by Panasonic Corporation. A distance between the lead-acid battery positive electrode terminal 22 and the lead-acid battery negative electrode terminal 24 of the lead-acid battery 20 is 180 mm. Note that a voltage value/resistance value of the lead-acid battery 20 itself measured before obtaining each measurement result illustrated in FIGS. 4A and 4B was 12.67 V/6.49 mΩ.

As the power supply 30, a power supply with a model number "IT6720" manufactured by ITECH ELECTRONIC CO., LTD was prepared. For the power supply 30, it was possible to set an output voltage in a range of 0 to 60 V, an output current in a range of 0 to 5 a, and output power in a range of 0 to 100 W, and the output voltage of the power supply 30 was variably set such that a "lead-acid battery voltage value" between the lead-acid battery positive electrode terminal 22 and the lead-acid battery negative electrode terminal 24 is 11.9 V, 12.9 V, or 13.9 V.

The connection lines 40 and 50 were general-purpose connection lines including brass, having a length of 60 cm and a line width of 0.5 sq (corresponding to AWG 20). The connection lines 40 and 50 were arranged such that portions to positions of about 48 cm from the substrate positive electrode terminal 100A and the substrate negative electrode terminal 100B of the lead sulfate coating removal device 10 were linearly and substantially in close contact with each other, and the remaining portions of about 12 cm branched therefrom extended obliquely to each other toward the lead-acid battery positive electrode terminal 22 and the lead-acid battery negative electrode terminal 24 of the lead-acid battery 20.

As the connection lines 60 and 70, general-purpose connection lines including brass, having a length of 5 cm and an inductor of 470 μH/3 A were used.

FIG. 4B is a diagram illustrating measurement results of a voltage value and a current value corresponding to a "peak current value" measured in a state where a lead sulfate coating removal device of a comparative example implemented by an analog circuit is connected to the lead-acid battery 20 in order to compare with the measurement results illustrated in FIG. 4A.

For the lead-acid battery 20, the power supply 30, and the connection lines 60 and 70 for obtaining each measurement result illustrated in FIG. 4B, the same ones as those prepared for obtaining each measurement result illustrated in FIG. 4A were prepared and used under the same conditions. The others are as follows.

The lead sulfate coating removal device of the comparative example is implemented by the analog circuit while the lead sulfate coating removal device 10 of the present embodiment is implemented by the ASIC. For specifications of the respective elements constituting the lead sulfate coating removal device of the comparative example, the values exemplified in parentheses in the description made with reference to FIG. 2 were adopted, as in the lead sulfate coating removal device 10. Therefore, a substantial difference between the two devices is only an upper limit of the peak current, as described above.

Connection lines corresponding to the connection lines 40 and 50 were general-purpose connection lines including brass, having a length of 54 cm and a line width of 1.25 sq (corresponding to AWG 16). The reason why the connection lines 40 and 50 were not connected to the lead sulfate coating removal device of the comparative example is that sizes of terminals of the device are different from those of the substrate positive electrode terminal 100A and the substrate negative electrode terminal 100B.

Note that the connection lines corresponding to the connection lines 40 and 50 were selected under the condition that electrical resistances and the like of the connection lines 40 and 50 and the connection lines corresponding thereto were substantially the same. The connection lines corresponding to the connection lines 40 and 50 were arranged such that portions to positions of about 42 cm from a side of the lead sulfate coating removal device of the comparative example were separated from each other by about 2 cm in a linear and parallel manner, and the remaining portions of about 12 cm branched therefrom extended obliquely to each other toward the lead-acid battery positive electrode terminal 22 and the lead-acid battery negative electrode terminal 24 of the lead-acid battery 20.

Note that, in both the measurement results illustrated in FIGS. 4A and 4B and measurement results illustrated in FIG. 5 to be described later, when various types of measurement were performed, the lead-acid battery 20 immediately after completion of charging was used, conditions such as ambient environmental temperature were substantially the same, and factors affecting the measurement results were eliminated as much as possible.

As illustrated in FIG. 4A, in the case of the lead sulfate coating removal device 10 of the present embodiment, when a supply voltage of the power supply 30 was variable such that the "lead-acid battery voltage value" was 11.9 V, 12.9 V, or 13.9 V, the "peak current value" was 675 mA, 733 mA, or 793 mA, respectively.

According to the measurement results illustrated in FIG. 4A, it can be seen that the peak current is 675 mA to 793 mA. Note that it is obvious to those skilled in the art that a value of the peak current can be easily controlled by changing a resistance value of any one of the drive resistor 120 and the voltage dividing resistors 130 and 140.

Furthermore, here, the measurement results on the premise of the "12 V lead-acid battery" are illustrated, but those skilled in the art can easily understand that in a case where, for example, a "24 V lead-acid battery" is used instead of the "12 V lead-acid battery", the "peak current value" also increases with an increase in the "lead-acid battery voltage value". In the present embodiment, the upper limit of the "peak current value" is designed to be 1000 mA in such a case.

On the other hand, in the case of the lead sulfate coating removal device of the comparative example, when the supply voltage of the power supply 30 was variable such that the "lead-acid battery voltage value" was 11.9 V, 12.9 V, or 13.9 V, the "peak current value" was merely 540 mA, 570 mA, or 600 mA, respectively.

The present inventors verified the peak current in a range of 550 mA to 1000 mA. As a result, an amount of the lead sulfate coating removed exceeded an amount of the lead sulfate coating generated on the lead-acid battery negative electrode terminal 24, and the lead sulfate coating was able to be effectively removed, while no damage was found in the electrode of the lead-acid battery 20.

Note that it is also obvious to those skilled in the art that the pulse width and the frequency of the pulse signal can be easily controlled by appropriately changing the specifications of the constant current source output circuit, the oscillator, the frequency dividing circuit, and the like in the signal generation unit 160. Also in a case where the conditions of the frequency and the peak value were set to the above range and the pulse width was set to 5 nsec to 100 nsec and in a case where the conditions of the peak value and the pulse width were set to the above range and the frequency was set to 5 kHz to 50 kHz, the amount of the lead sulfate coating removed exceeded the amount of the lead sulfate coating generated on the lead-acid battery negative electrode terminal 24, and the lead sulfate coating was able to be effectively removed, while no damage was found in the electrode of the lead-acid battery 20.

FIG. 5 is a diagram illustrating measurement results of lead-acid battery voltage values and the like before and after recovery of the lead sulfate coating removal device 10 for the lead-acid battery 20 mounted on a vehicle and the like. The voltage values were measured in the vicinity of the lead-acid battery positive electrode terminal 22 and the lead-acid battery negative electrode terminal 24, and elements having the specifications described with reference to FIG. 2 were used for the lead sulfate coating removal device 10.

Furthermore, measurement items may be different depending on a type of a connection destination of the lead sulfate coating removal device 10 (for example, a cold cranking ampere (CCA) value may be indicated, or a measurement result of a "specific gravity value" may be indicated). This is because a measurement item that can be evaluated for a removal effect of a lead sulfate coating varies depending on an object to be measured, it is difficult or not possible to obtain a measurement result of a specific measurement item for the object to be measured in the first place, or the like.

First, lead-acid batteries 20 mounted on two golf carts a and b will be described. Each of the lead-acid batteries 20 of the golf carts a and b is mounted with six 12 V lead-acid batteries 20 ("SER38-12" manufactured by GS Yuasa Corporation). The measurement results illustrated in FIG. 5 are averages of measurement values of the six lead-acid batteries 20.

Internal resistance values of the golf carts a and b were measured on the basis of a voltage drop between an open voltage and a load resistance of the lead-acid battery 20. The internal resistance value increases as a use period of the lead-acid battery 20 becomes longer, and capacity of the lead-acid battery 20 decreases in proportion thereto. Regarding the internal resistance value, there is no absolute value that becomes a merkmal as a rule, and the removal effect of the lead sulfate coating can be evaluated according to relative magnitude of the value.

Each resistance difference of the golf carts a and b is a value obtained by subtracting a minimum value from a maximum value of the internal resistance value of the lead-acid battery 20. Therefore, the smaller this value, the smaller variation in resistance difference between the lead-acid batteries 20, and the better a state of the lead-acid battery 20.

First, measurement results of the lead-acid battery 20 mounted on the golf cart a will be considered. The voltage value was 13.05 V before recovery, and was 13.03 V after recovery, and no significant change is observed. The internal resistance value was 8.76 mΩ before recovery, and was 8.29 mΩ after recovery, which indicates that the internal resistance value is improved.

Next, measurement results of the lead-acid battery 20 mounted on the golf cart b will be considered. The voltage value was 13.01 V before recovery, and was 13.00 V after recovery, which is considered to be a measurement error. The internal resistance value was 8.86 mΩ before recovery, and was 8.41 mΩ after recovery, which indicates that the internal resistance value is improved.

To summarize the consideration results, according to the measurement results of the lead-acid battery 20 mounted on the golf cart a, since the internal resistance value is improved, it can be said that the use of the lead sulfate coating removal device 10 has a removal effect of a salt coating.

On the other hand, according to the measurement results of the lead-acid battery 20 mounted on the golf cart b, although a slight removal effect is observed, it is presumed that lead sulfate was not much adhered to the lead-acid battery negative electrode terminal 24 of the golf cart b.

Next, lead-acid batteries 20 mounted on two automobiles c and d will be described. The lead-acid battery 20 of the automobile c is mounted with one 12 V lead-acid battery 20 ("BLA-95-L5" manufactured by Bosch Corporation). The lead-acid battery 20 of the automobile d is mounted with one 12 V lead-acid battery 20 (M-42 LB314 manufactured by GS Yuasa Corporation).

A CCA value of the automobile c is a performance reference value indicating capacity of the lead-acid battery 20 to start an engine. Regarding the CCA value, since a reference value varies depending on a manufacturer, a type, and the like of the lead-acid battery, there is no absolute value that becomes a merkmal as a rule, and the removal effect of the lead sulfate coating can be evaluated according to relative magnitude of the value.

Evaluation of the internal resistance value of the lead-acid battery 20 mounted on the automobiles c and d is as described for that of the golf carts a and b, and thus it can be evaluated that the removal effect of the lead sulfate coating is higher as the internal resistance value becomes relatively smaller.

First, measurement results of the lead-acid battery 20 mounted on the automobile c will be considered. The voltage value was 12.64 V before recovery, and was 13.07 V after recovery, and no significant change is observed. The CCA value was 711 before recovery, and was 826 after recovery, which indicates that the CCA value is greatly improved. The internal resistance value was 3.25 mΩ before recovery, and was 2.80 mΩ after recovery, which indicates that the internal resistance value is improved.

Measurement results of the lead-acid battery 20 mounted on the automobile d will be considered. The voltage value was 13.29 V before recovery, and was 13.42 V after recovery, and no significant change is observed. An average of specific gravity values of six cells constituting the lead-acid battery 20 was 1.00 before recovery, and was 1.20 after recovery, which indicates that the average of the specific gravity values is improved. The internal resistance value was 6.94 mΩ before recovery, and was 6.03 mΩ after recovery, which indicates that the internal resistance value is improved.

To summarize the consideration results, according to the measurement results of the lead-acid battery 20 mounted on the automobile c, the CCA value and the internal resistance value are improved, and it can be said that the removal effect of the salt coating by using the lead sulfate coating removal device 10 is large.

On the other hand, according to the measurement results of the lead-acid battery 20 mounted on the automobile d, the average of the specific gravity values and the internal resistance value are improved, and it can be said that the removal effect of the salt coating by using the lead sulfate coating removal device 10 is large.

The lead sulfate coating removal device 10 described above can also be a lead sulfate coating removal system including the lead sulfate coating removal device 10, a measurement device that performs measurement indicating performance of the lead-acid battery 20 to which the lead sulfate coating removal device 10 is connected, and a transmission device that transmits a measurement result measured by the measurement device.

Typical examples of an object to be measured indicating the performance of the lead-acid battery 20 measured by the measurement device include the peak current illustrated in FIG. 5 and the internal resistance value illustrated in FIG. 5. Moreover, since the internal resistance value is easily affected by temperature, ambient temperature can also be included so that evaluation in consideration of the temperature as well can be performed. Therefore, the measurement device may include a sensor or the like that measures some of these.

There are several conceivable transmission destinations of the measurement result transmitted by the transmission device, such as an administrator of an electric device on which the lead-acid battery 20 is mounted and/or an administrator of the lead sulfate coating removal system of the present embodiment. Furthermore, the measurement result may be directly transmitted to these persons, or may be transmitted once to a cloud server (not illustrated) and then indirectly transmitted from the cloud server to these persons. As a transmission technology, one method is to use a communication standard such as low power wide area (LPWA), use wireless transmission or an optical fiber as a transmission medium, and set a transmission frequency to once every month, for example. However, the transmission technology is not limited thereto.

According to the lead sulfate coating removal system of the present embodiment, when the lead sulfate coating removal device 10 is connected to the lead-acid battery 20 of a communication base station used in a mountain area or the like, it is also possible to remove a lead sulfate coating generated in the lead-acid battery 20, and it is possible for an administrator in a remote location, for example, to obtain a measurement result that serves as a basis for determining replacement standards for the lead-acid battery 20.

As described above, in the present embodiment, the case where the lead sulfate coating adhered to the lead-acid battery negative electrode terminal 24 is removed has been described as an example, but some lead-acid batteries 20 include a plurality of cells, and in that case, it is also possible to remove the lead sulfate coating adhered to the negative electrode of each of the cells.

What is claimed is:

1. A lead sulfate coating removal device implemented by an application specific digital integrated circuit that removes a lead sulfate coating generated on an electrode of a lead-acid battery, the lead sulfate coating removal device comprising:

a generation unit that generates, on the basis of a signal extracted from the lead-acid battery, a removal signal of the lead sulfate coating having a peak value of 550 mA to 1000 mA, a pulse width of 5 nsec to 100 nsec, and a frequency of 5 kHz to 50 kHz; and a supply unit that supplies the removal signal generated by the generation unit to the electrode of the lead-acid battery.

2. The lead sulfate coating removal device according to claim 1, wherein the digital integrated circuit includes:

a reference power supply circuit that generates a $P_{TAT}$ signal;

a constant current circuit that generates a $C_{TAT}$ signal on the basis of the $P_{TAT}$ signal generated by the reference power supply circuit;

a control circuit that controls on/off switching of an output of a merged signal of the $P_{TAT}$ signal generated by the reference power supply circuit and the $C_{TAT}$ signal generated by the constant current circuit;

an inter-terminal switch circuit that switches electrical connection between a first electrode terminal and a second electrode terminal of the lead-acid battery on the basis of the merged signal subjected to the control of the on/off switching of the output by the control circuit;

an oscillation circuit that generates a pulse signal based on the $P_{TAT}$ signal generated by the reference power supply circuit and the $C_{TAT}$ signal generated by the constant current circuit;

a frequency dividing circuit that divides a frequency of the pulse signal generated by the oscillation circuit;

a level shift circuit that shifts a level of a power supply voltage on the basis of the pulse signal whose frequency is divided by the frequency dividing circuit;

a drive circuit that generates a drive signal of a pulse driver circuit on the basis of the voltage whose level is shifted by the level shift circuit;

a drive switch circuit that switches presence or absence of an output of the drive signal on the basis of the pulse signal whose frequency is divided by the frequency dividing circuit; and the pulse driver circuit that generates the removal signal on the basis of the drive signal whose presence or absence of the output is switched by the drive switch circuit.

3. A lead sulfate coating removal system comprising:

the lead sulfate coating removal device according to claim 1;

a measurement device that performs measurement indicating performance of a lead-acid battery to which the lead sulfate coating removal device is connected; and a transmission device that transmits a measurement result measured by the measurement device.

4. A lead sulfate coating removal method using a lead sulfate coating removal device implemented by an application specific digital integrated circuit that removes a lead sulfate coating generated on an electrode of a lead-acid battery, the lead sulfate coating removal method comprising:

generating, on the basis of a signal extracted from the lead-acid battery, a removal signal of the lead sulfate coating having a peak value of 550 mA to 1000 mA, a pulse width of 5 nsec to 100 nsec, and a frequency of 5 kHz to 50 kHz; and supplying the generated removal signal to the electrode of the lead-acid battery.

* * * * *